(12) United States Patent
Sambo et al.

(10) Patent No.: US 9,338,529 B2
(45) Date of Patent: May 10, 2016

(54) ROUTING AND BANDWIDTH ASSIGNMENT FOR FLEXIBLE GRID WAVELENGTH SWITCHED OPTICAL NETWORKS

(75) Inventors: Nicola Sambo, Leghorn (IT); Giulio Bottari, Leghorn (IT); Piero Castoldi, Vicopisano (IT); Filippo Cugini, Fidenza (IT); Paola Iovanna, Rome (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 107 days.

(21) Appl. No.: 14/240,232

(22) PCT Filed: Sep. 30, 2011

(86) PCT No.: PCT/EP2011/067166
§ 371 (c)(1),
(2), (4) Date: Jul. 10, 2014

(87) PCT Pub. No.: WO2013/026498
PCT Pub. Date: Feb. 28, 2013

(65) Prior Publication Data
US 2014/0341572 A1    Nov. 20, 2014

(30) Foreign Application Priority Data
Aug. 23, 2011  (EP) ...................................... 1178448

(51) Int. Cl.
*H04J 14/02* (2006.01)
*H04Q 11/00* (2006.01)

(52) U.S. Cl.
CPC .......... *H04Q 11/0062* (2013.01); *H04J 14/026* (2013.01); *H04J 14/0227* (2013.01);
(Continued)

(58) Field of Classification Search
CPC .. H04J 14/026; H04J 14/0267; H04J 14/0271
USPC .................................................. 398/48, 45, 43
See application file for complete search history.

(56) References Cited

U.S. PATENT DOCUMENTS

| 8,873,962 B2 * | 10/2014 | Patel | .................... | H04J 14/0224 398/48 |
| 2014/0205281 A1 * | 7/2014 | Sone | .................... | H04J 14/0201 398/25 |

(Continued)

OTHER PUBLICATIONS

Jinno [Distance-adaptive spectrum resource allocation in spectrum-sliced elastic optical path network, Topics in Optical Communications, IEEE Communcaitons Magazine, Aug. 2010].*

(Continued)

*Primary Examiner* — Oommen Jacob
(74) *Attorney, Agent, or Firm* — Nicholson De Vos Webster Elliott LLP

(57) ABSTRACT

Routing and bandwidth assignment of new paths of different bandwidths, occupying different numbers of adjacent frequency slots in a wavelength switched optical network, involves selecting a route, and assigning a set of adjacent frequency slots. The assignment can place wider bandwidth ones of the new paths at an opposite end of a spectrum of the available frequency slots, to an end where narrower bandwidth ones are placed. A size of sets of available adjacent slots remaining after the assignment is likely to be increased, compared to a conventional first fit assignment. A wider subsequent new path can sometimes be accommodated along all or some of the route and thus the blocking probability can be lowered. The selecting of which of the possible routes to use can be made dependent on which has more sets of available adjacent frequency slots, or which has a wider gap between occupied slots.

20 Claims, 12 Drawing Sheets

(52) U.S. Cl.
CPC ......... *H04J14/0257* (2013.01); *H04J 14/0267* (2013.01); *H04J 14/0271* (2013.01); *H04J 14/0224* (2013.01); *H04J 14/0269* (2013.01); *H04Q 2011/0086* (2013.01)

(56) References Cited

U.S. PATENT DOCUMENTS

2014/0328587 A1* 11/2014 Magri ................ H04Q 11/0066
398/26
2014/0341572 A1* 11/2014 Sambo ................ H04J 14/0257
398/48

OTHER PUBLICATIONS

Christodoulopoulos, K., et al., "Dynamic Bandwidth Allocation in Flexible OFDM-based Networks", OSA/OFC/NFOEC 2011, 3 pages.

Jinno, Masahiko, et al., "Distance-Adaptive Spectrum Resource Allocation in Spectrum-Sliced Elastic Optical Path Network", Topics in Optical Communications, IEEE Communication Magazine, Aug. 2010, 8 pages.

Klinkowski, Miroslaw, et al., "Routing and Spectrum Assignment in Spectrum Sliced Elastic Optical Path Network", IEEE Communications Letters vol. 15 No. 8, Aug. 2011, 3 pages.

Pfau, Timo, "Hardware requirements for coherent systems beyond 100G DSP & FEC: Towards the Shannon Limit", Sep. 20, 2009, 10 pages.

Sambo, Nicola, et al., "Modeling and Distributed Provisioning in 10-40-100-Gb/s Multirate Wavelength Switched Optical Networks", Journal of Lightwave Technology, vol. 29, No. 9, May 1, 2011, 10 pages.

Takara, Hldehlko, et al., "Distance-Adaptive Path Allocation in Elastic Optical Path Networks", The Institute of Electronics, Information and Communication Engineers, 2011, 8 pages.

International Search Report, Application No. PCT/EP2011/067166, Mar. 5, 2012, 2 pages.

"Efficient and optimized network architecture: Requirements and reference scenarios", Strongest—Document, Feb. 28, 2014, 85 pages.

"From Coarse Grid to Mini-Grid to Gridless: How Much can Gridless Help Contentionless?", OSA/OFC/NFOEC 2011, 3 pages.

"Spectral grids for WDM applications: DWDM frequency grid", G.694.1, Jun. 2002, 14 pages.

\* cited by examiner

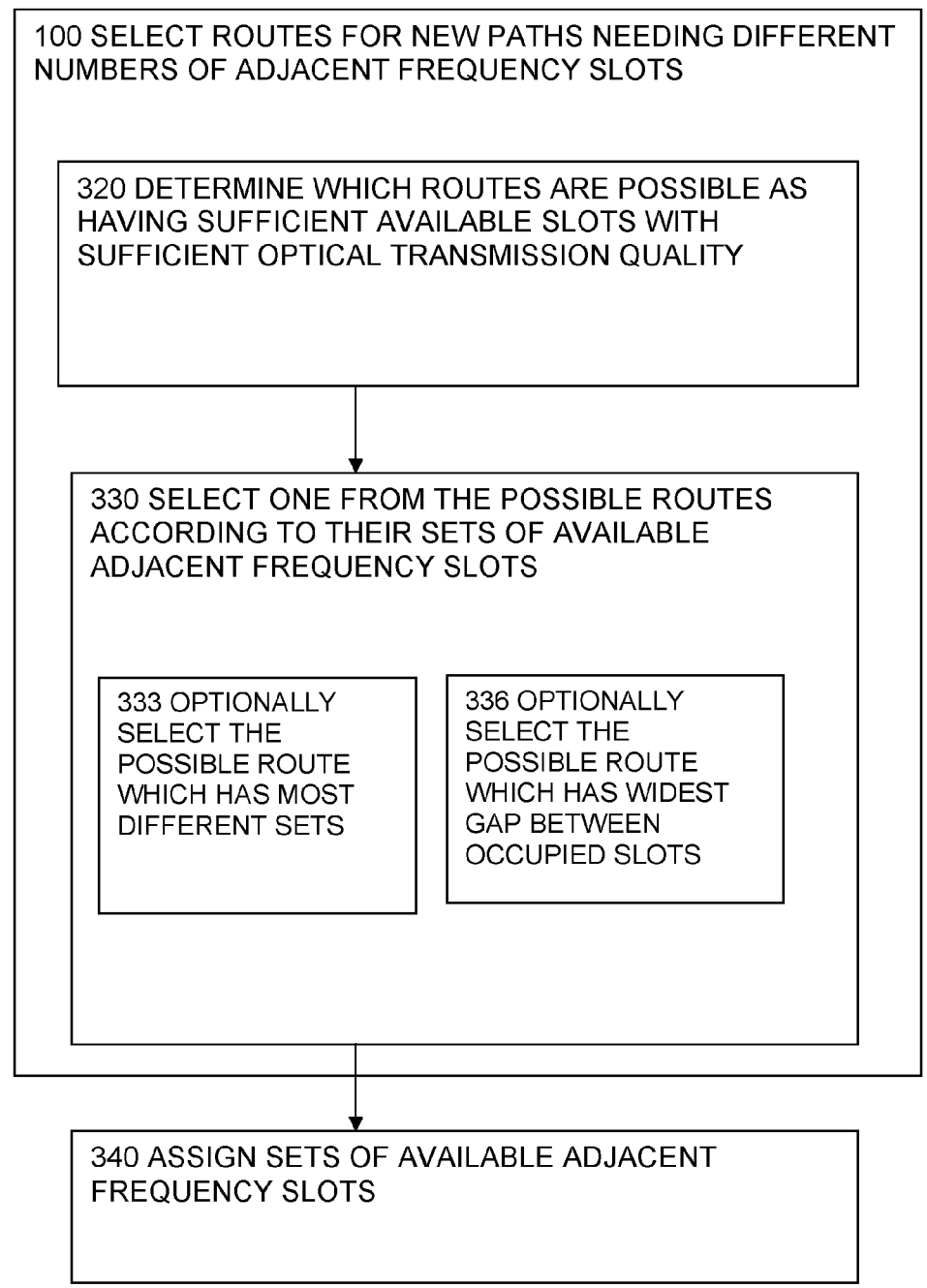

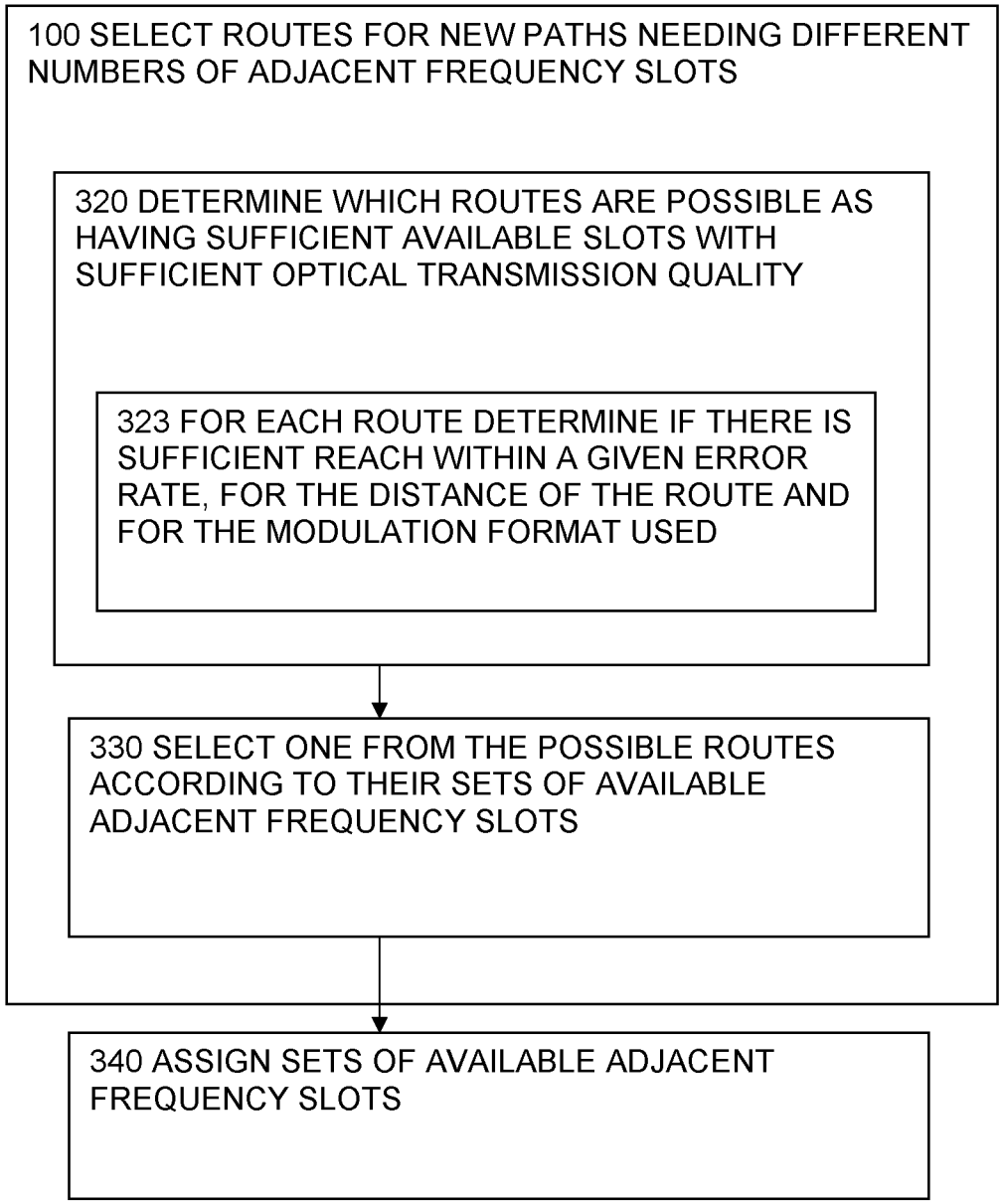

FIG 12

100 SELECT ROUTES FOR NEW PATHS NEEDING DIFFERENT NUMBERS OF ADJACENT FREQUENCY SLOTS

320 DETERMINE WHICH ROUTES ARE POSSIBLE AS HAVING SUFFICIENT AVAILABLE SLOTS WITH SUFFICIENT OPTICAL TRANSMISSION QUALITY

323 FOR EACH ROUTE DETERMINE IF THERE IS SUFFICIENT REACH WITHIN A GIVEN ERROR RATE, FOR THE DISTANCE OF THE ROUTE AND FOR THE MODULATION FORMAT USED

327 IF THERE IS NOT SUFFICIENT REACH, CHECK IF OPTICAL REGENERATION IS AVAILABLE ALONG THE ROUTE TO EXTEND THE REACH SUFFICIENTLY

330 SELECT ONE FROM THE POSSIBLE ROUTES ACCORDING TO THEIR SETS OF AVAILABLE ADJACENT FREQUENCY SLOTS

340 ASSIGN SETS OF AVAILABLE ADJACENT FREQUENCY SLOTS

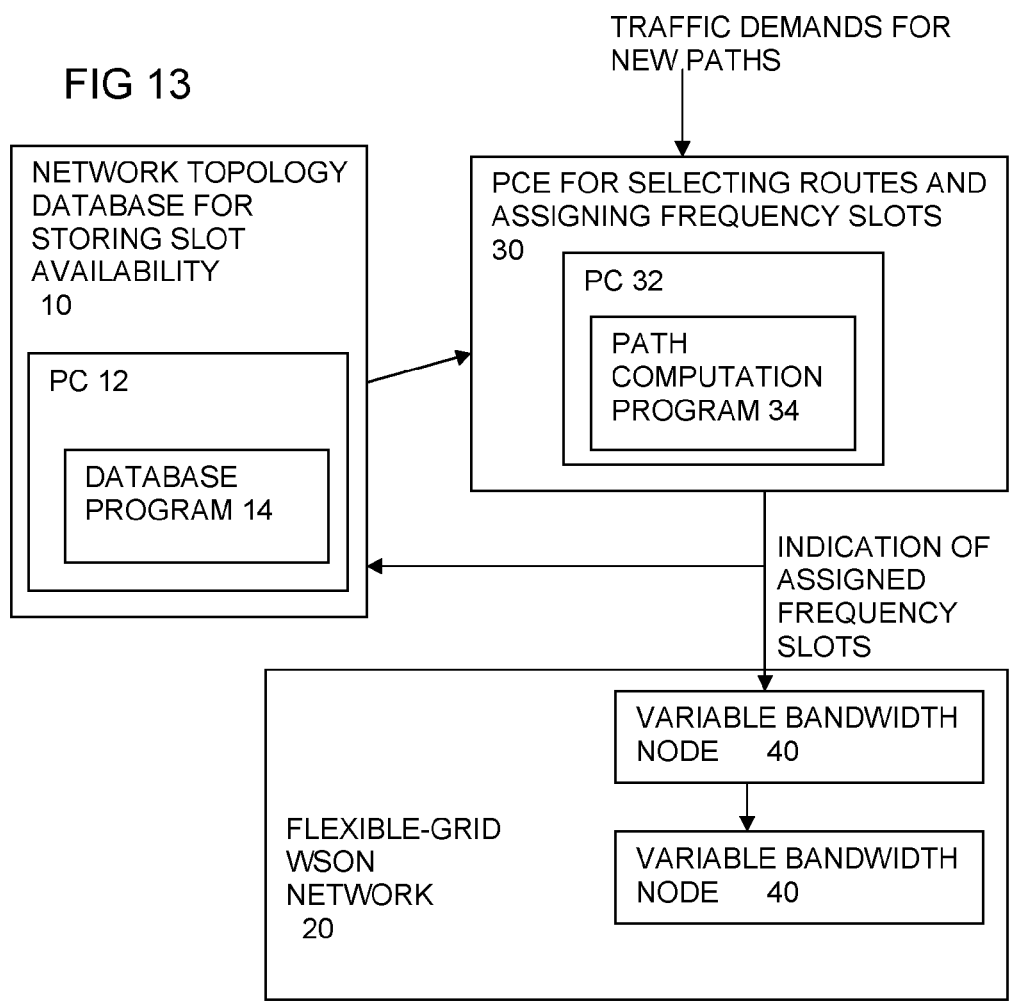

US 9,338,529 B2

ROUTING AND BANDWIDTH ASSIGNMENT FOR FLEXIBLE GRID WAVELENGTH SWITCHED OPTICAL NETWORKS

CROSS-REFERENCE TO RELATED APPLICATIONS

This application is a National stage of International Application No. PCT/EP2011/067166, filed Sep. 30, 2011, which claims priority to EP Application No. 11178448.4, filed Aug. 23, 2011, which are hereby incorporated by reference.

FIELD

The present invention relates to methods of routing and wavelength assignment of new paths in a wavelength switched optical network carrying paths of different bandwidths, and to corresponding apparatus and to corresponding computer programs.

BACKGROUND

ITU-T is currently revising the G.694.1 recommendation (G.694.1 "Spectral grids for WDM applications: DWDM frequency grid", ITU-T Recommendation, June 2002) which defines the most common frequency grid, used for channel spacing in DWDM. Study Group 15 of ITU-T is discussing what could be a more effective grid spacing to be adopted in next generation optical networks.

Bandwidth-variable optical cross connects (BV-OXCs) have been recently proposed to improve frequency spectrum utilization in Wavelength Switched Optical Networks (WSONs). Preliminary BV-OXC implementations have been presented to show the operation with different modulation formats and bit rates. BV-OXCs overcome the fixed ITU-T grid spacing by enabling per port allocation of a configurable portion of the frequency spectrum. The evolution towards a flexible grid is likely to be a "next step" in products having a Reconfigurable Optical Add Drop Multiplexer (ROADM) capability.

There are various different points of view about how to implement such flexible grids to enable improved bandwidth efficiency in photonic in general and in WSON in particular. One challenging aspect of such flexible grid technology is how to implement path computation across a WSON mesh operating on a flexible grid WDM infrastructure. The already complex Routing and Wavelength Assignment (RWA) exercise becomes even more difficult when well defined "channels", operating on a rigid grid with a fixed bit rate and modulation format, are replaced with flexible "frequency slots" operating on a flexible grid with the additional degree of freedom of the "tunable" modulation format in some cases. The RWA may need to evolve towards becoming effectively a Routing and Spectrum Assignment (RSA) computation, designed to efficiently exploit the flexible spectrum resources. However existing RWA solutions are not directly applicable to BV-OXC due to the different bandwidth granularity of the frequency grid and the optical signals. Dynamic RSA schemes have been proposed in the context of optical orthogonal frequency-division multiplexing (OFDM) where the fine granularity of elastic requests is specifically exploited to occupy a freely variable number of adjacent sub-carriers, as shown in: K. Christodoulopous, et al., "Dynamic bandwidth allocation in flexible OFDM-based networks," in Proc. of OFC/NFOEC, 2011. It is known to make a frequency slot assignment based on first fit technique, meaning a lowest indexed available set of slots is chosen for a new path.

SUMMARY

Embodiments of the invention provide improved methods and apparatus. According to a first aspect of the invention, there is provided a method of routing and bandwidth assignment of new paths in a wavelength switched optical network, the network being arranged to carry paths of different bandwidths, occupying different numbers of adjacent frequency slots. A route is selected for each of the new paths, and a set of adjacent frequency slots is assigned to each respective new path. For selected routes having more than one available set of sufficient adjacent frequency slots for their respective new paths, the assignment is made so as to place wider ones of the new paths at an end of a spectrum of the available frequency slots, opposite to an end of the spectrum of frequency slots where narrower ones of the new paths are placed.

A benefit of this assignment as shown in FIG. 2 described below, is that a size of sets of available adjacent slots remaining after the assignment is likely to be increased, compared to a conventional first fit assignment method. This means that a wider subsequent new path can sometimes be accommodated along all or some of the route than in the conventional case. Thus the slots can be filled more efficiently and the blocking probability can be lowered. This effect arises for example where there is a wider and a narrower new path and the narrower new path is subsequently dropped. If the wider new path is at the opposite end of the available slots, then there is more likely to be one large remaining set, whereas in the conventional first fit assignment case, there might be two smaller remaining sets on either side of the wider new path.

Another aspect provides apparatus for routing and bandwidth assignment of new paths in a wavelength switched optical network, the network being arranged to carry paths of different bandwidths, occupying different numbers of adjacent frequency slots. The apparatus has a part for selecting a route for each of the new paths, and for assigning a set of adjacent frequency slots to each respective new path. For selected routes having more than one available set of sufficient adjacent frequency slots for their respective new paths, the assignment is made so as to place wider ones of the new paths at an end of a spectrum of the available frequency slots, opposite to an end of the spectrum of frequency slots where narrower ones of the new paths are placed.

In principle the selecting part can be centralized or distributed in the nodes of the network. So the selecting part for a given new path may be located at the source or destination node of that new path.

Another aspect provides a method of routing and bandwidth assignment of new paths in a wavelength switched optical network, the network being arranged to carry paths of different bandwidths, occupying different numbers of adjacent frequency slots. A route is selected for each of the new paths, and a set of adjacent frequency slots is assigned to each respective new path. The selection of the route involves determining which routes are possible in terms of having sufficient available adjacent frequency slots with sufficient optical transmission quality for the respective new path, and selecting which of the possible routes to use according to their sets of available adjacent frequency slots.

As shown in FIG. 6 described below, a benefit is that routing can be carried out to steer paths away from bottlenecks, and thus there may be a reduced chance of blocking.

Another aspect provides apparatus for routing and bandwidth assignment of new paths in a wavelength switched optical network, the network being arranged to carry paths of different bandwidths, occupying different numbers of adjacent frequency slots. The apparatus has a selection part for selecting a route for each of the new paths, and an assignment part for assigning a set of adjacent frequency slots to each respective new path. The selection part is arranged to determine which routes are possible in terms of having sufficient available adjacent frequency slots with sufficient optical transmission quality for the respective new path, and to select which of the possible routes to use according to their sets of available adjacent frequency slot.

Another aspect provides a corresponding computer program.

Any additional features can be added to any of the aspects, and some such additional features are set out below. Where the network is able to carry paths using different modulation formats, the slot assignment can be made dependent on the modulation format chosen for the respective new path, as shown in FIG. 4 described below. A benefit of this is that more efficient modulation formats in terms of bandwidth needed can be used where possible, thus increasing the capacity or reducing blocking.

In some cases, where the network has a path computation element and a database of slot availabilities, assigning of the slots can be carried out by the path computation element by accessing the database of slot availabilities as shown in FIG. 1 described below. A benefit of having slot availability information in database is that the calculation can be carried out more efficiently.

In some cases only the paths having the widest of the path sizes are assigned to the opposite end of the spectrum as shown in FIG. 3, described below. A benefit of this is simplicity whilst maintaining much of the benefit of more complex splits.

In some cases the selection of the route is made according to which of the possible routes has a larger number of different sets of available adjacent frequency slots as shown in FIGS. 7A, 7B, and 8, described below. A benefit of this is it can help to reduce bottlenecks in the network.

In some cases the selection of the route is made based on a first modulation format, and if no route is possible for a given new path using the first modulation format, the step of selecting the route comprises trying again using a second, less efficient modulation format which needs to occupy more adjacent frequency slots, as shown in FIG. 9. A benefit of this is that more efficient utilisation of capacity is possible.

In some cases the routing and frequency slot assignment is carried out dynamically in real time for requests for new paths while the network is live, as shown in FIG. 10. A benefit of this is that the amount of calculation needed is not too great for real time use. Hence the techniques can be used for adding new traffic requests or for optimising the network during use, as well as for planning purposes off-line.

The selection of the route can be made based on a first modulation format, and if no route is possible for a given new path using the first modulation format, the selection of the route can involve trying again using a second, less efficient modulation format, needing to occupy more adjacent frequency slots, as shown in FIG. 9. This can help enable better utilisation of the network where possible. The routing and frequency slot assignment can be carried out dynamically in real time for requests for new paths while the network is live, as shown in FIG. 10.

The step of determining which routes are possible can have the steps of determining a distance for each route, and determining whether there is sufficient reach of an optical signal, according to a modulation format being used, for the distance involved, as shown in FIG. 11. The step of selecting which of the possible routes to use according to their sets of available adjacent frequency slots can comprise selecting according to which has a larger total number of different sets, as shown in FIG. 8 described below.

The step of selecting which of the possible routes to use according to their sets of available adjacent frequency slots can comprise selecting according to which has a wider gap between occupied slots, as shown in FIG. 8.

The step of determining of which routes are possible can involve, where there is not sufficient reach, determining if optical regeneration is available along the route, and determining if the route is possible with any available optical regeneration, as shown in FIG. 12, described below. This can enable longer routes to be considered, thus reducing blocking.

The modulation formats can comprise at least 4-QAM, 16-QAM, and 64-QAM, using a single carrier. In other cases they can comprise at least OFDM.

Any of the additional features can be combined together and combined with any of the aspects. Other effects and consequences will be apparent to those skilled in the art, especially compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 8 shows steps of a method according to another embodiment in which routes are selected according to which has most different sets or which has the widest gap between occupied slots.

FIG. 11 shows steps of a method according to another embodiment involving determining if there is sufficient reach with a given error rate, when selecting routes, FIG. 12 shows steps of a method according to another embodiment involving checking if optical regeneration is available along the route if there is not sufficient reach with a given error rate, and FIG. 13 shows a PC based PCE and database according to another embodiment.

DETAILED DESCRIPTION

Figure 1:
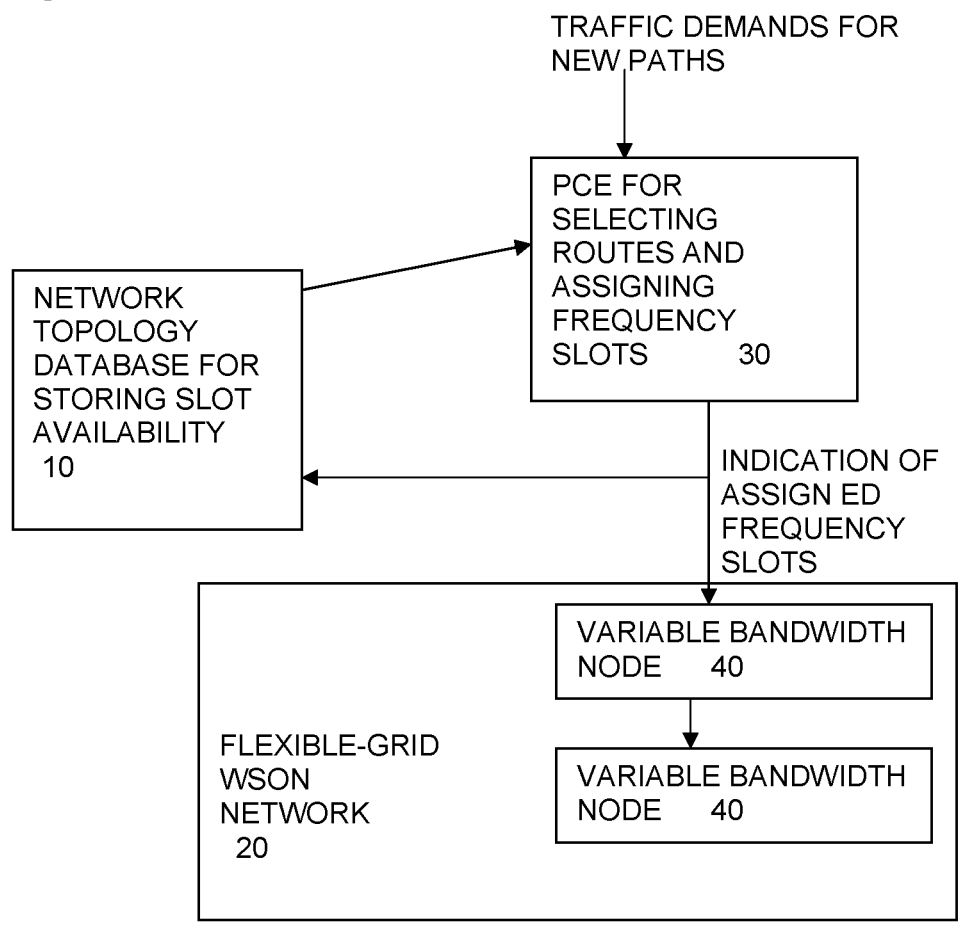
FIG. 1 shows a schematic view of a PCE, a database and a network.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to optical transmission quality can encompass any measure that represents the effectiveness of the transmission of data at the optical level, such as bit error rate or signal to noise ratio. It may encompass measurements or predictions with or without error correction, and measurements with or without any regeneration or other processing.

ABBREVIATIONS

PCE: Path Computation Element
WSON: wavelength switched optical network
BV-OXC: bandwidth variable optical cross-connect
DP-QPSK: dual polarization quadrature phase shift keying
OFDM: Orthogonal frequency division multiplexed
QAM: quadrature amplitude modulation
MaxSlots-MinBandwidth: maximum slot combinations with minimum required bandwidth
FF: first fit
LF: last fit
RSA: Routing and Spectrum Assignment

INTRODUCTION

By way of introduction to the embodiments, how they address some issues with conventional designs will be explained. There is a need for RSA strategies to handle the coarse granularity of lightpath requests and limit unused spare capacity in flexible-grid WSONs based on single-carrier transmission and other technologies. There is a need to provide effective dynamic provisioning, designed to operate within a Path Computation Element (PCE), which accounts for lightpaths supported by single-carrier transmission technologies (e.g., 100 and 400 Gb/s). The techniques described can in some cases account for the different bandwidth requirements and all-optical reach experienced by several modulation formats (e.g. 4-Quadrature Amplitude Modulation (QAM), 64-QAM). The PCE exploits several techniques which, depending on the modulation format, are able to allocate the required frequency slots along the path while limiting the spare capacity.

FIG. 1 PCE, Database and Network,

FIG. 1 shows a schematic view of a PCE 30, a database 10 for storing a network topology, and current slot availability information. A flexible-grid WSON network 20 has a number of variable bandwidth nodes 40 which may be for example ROADMs or BV-OXCs. Traffic demands are fed to the PCE. The PCE is coupled to the database to access the information about the network topology and the slot availability. The PCE is able to compute a route for the new path and to assign frequency slots to the new paths. An indication of the assigned frequency slots is sent to the relevant nodes in the network so that the new traffic can be passed over the network. The indication is also sent to the database to enable it to update the current slot availability information.

An example of a network to which this can be applied is a transparent WSON with E nodes and V bi-directional links, in which the nodes support transmission and reception at 100 and 400 Gb/s. 100 Gb/s is supported by dual polarization quadrature phase shift keying (DP-QPSK) or other techniques. 400 Gb/s is supported by dual polarization and 4-quadrature amplitude modulation (QAM), or 16-QAM, or 64-QAM for example. Bandwidth requirements of 100 Gb/s and all-optical reach are summarized in: T. Pfau, "Hardware requirements for coherent systems beyond 100G," in ECOC 2009.

An example of a model of quality of transmission for 100 Gb/s is detailed in Sambo, N.; Secondini, M.; Cugini, F.; Bottari, G.; Iovanna, P.; Cavaliere, F.; Castoldi, P.; "Modeling and Distributed Provisioning in 10-40-100-Gb/s Multirate Wavelength Switched Optical Networks," Lightwave Technology, Journal of, vol. 29, no. 9, pp. 1248-1257, May 1, 2011.

Each link supports S slots of bandwidth B (e.g., S=320 if B=12.5 GHz). PCE is devoted to path computation and slot assignment and it is aware of the QoT of any path in the network. Upon lightpath request of the given bit-rate from source s to destination d, s exploits the PCE communication protocol (PCEP) for submitting path computation requests to the PCE (i.e., using a PCEP PCReq message), which must carry bit-rate information. The database 20 can be a traffic engineering database with detailed and updated slot availability information, i.e. the status (reserved or available) of each slot of bandwidth B on every link. In an example, the PCE performs path computation depending on the bit-rate, the admitted modulation formats (i.e., the ones guaranteeing the QoT at the given bit-rate), and the available slots along the path. Typically for a path connecting s to d, depending on the admitted modulation format and bit-rate, the lightpath requires n-adjacent slots along the whole path. Also, similar to the wavelength continuity constraint, those slots must satisfy the slot continuity constraint, i.e. the same slots are available in all the links along the path.

Figure 2:
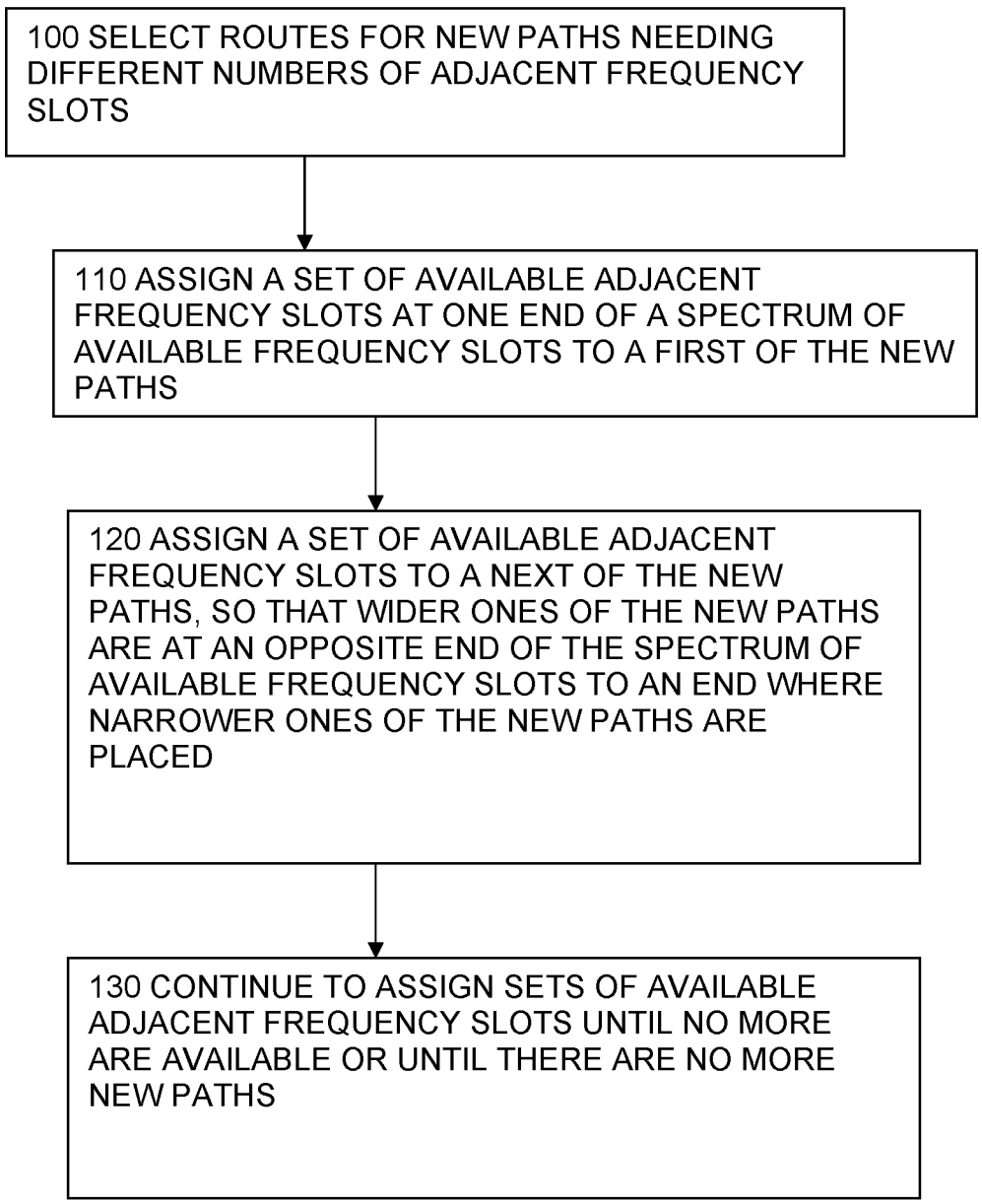
FIG. 2 shows steps of a method according to an embodiment.

FIG. 2 Method According to an Embodiment,

FIG. 2 shows steps of a method according to an embodiment, and may be carried out at the PCE part of FIG. 1 for example. Step 100 shows selecting routes for new paths needing different numbers of adjacent frequency slots. The route may be in terms of nodes. At step 110, a first of the new paths is assigned a set of adjacent slots along its selected route. The slots are at one end of a spectrum of available frequency slots. At step 120, a set of available adjacent frequency slots are assigned to a next of the new paths so that wider ones of the new paths, wider in terms of needing more slots, are at an opposite end of the spectrum of available frequency slots to an end where narrower ones of the new paths are assigned.

At step 130, sets of available adjacent frequency slots are assigned to further new paths in a similar fashion until no more are available or until there are no more new paths.

Figure 3:
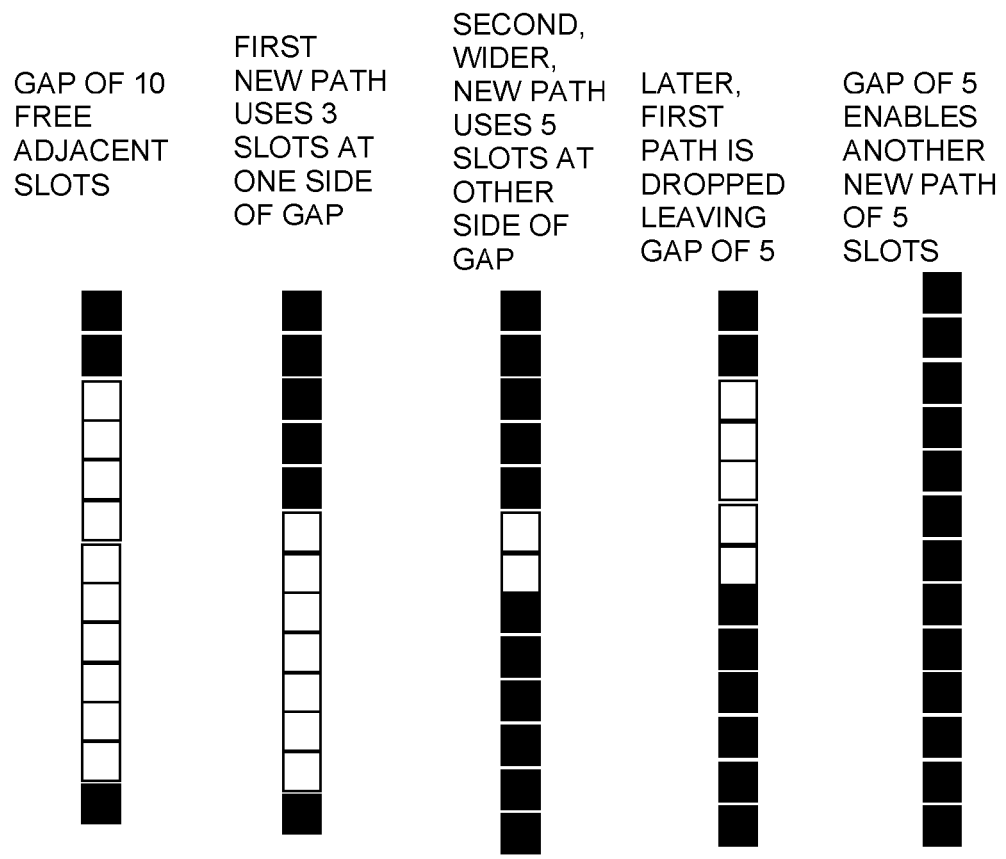
FIG. 3 shows a view of which slots are occupied at a sequence of different times according to an embodiment.

FIG. 3 Slot Occupation at Different Times

FIG. 3 shows a view of which slots are occupied at a sequence of different times according to an embodiment. Time flows from left to right in this figure. Black squares represent occupied slots, and white squares represent available slots. In each column, thirteen adjacent frequency slots are represented. In practice there may be many more. At a first moment in time, as shown at the left side, there are two occupied slots then ten available slots, then one occupied slot. Thus there is a gap of ten slots. Next, a first new path is assigned three slots at one side of the gap, as shown by the second column. The third column shows the position after a second, wider new path has been assigned the five slots at the other side of the gap. This leaves a remaining gap of two slots. Later the first new path is dropped, leaving a gap of five slots as shown by the fourth column.

Note that according to conventional first fit techniques this would have left two gaps of two and three slots, which is less useful. As shown in the fifth column, another new path needing five slots has been added, leaving no gap. As can be seen, this new path would have been blocked if the prior art first fit technique had been used. Hence this example demonstrates one scenario to help explain how the overall blocking probability can be reduced by making the assignment so as to place wider ones of the new paths at an opposite end of a spectrum of the available frequency slots, opposite to an end where narrower ones of the new paths are placed. This means remaining gaps are more likely to be larger.

Figure 4:
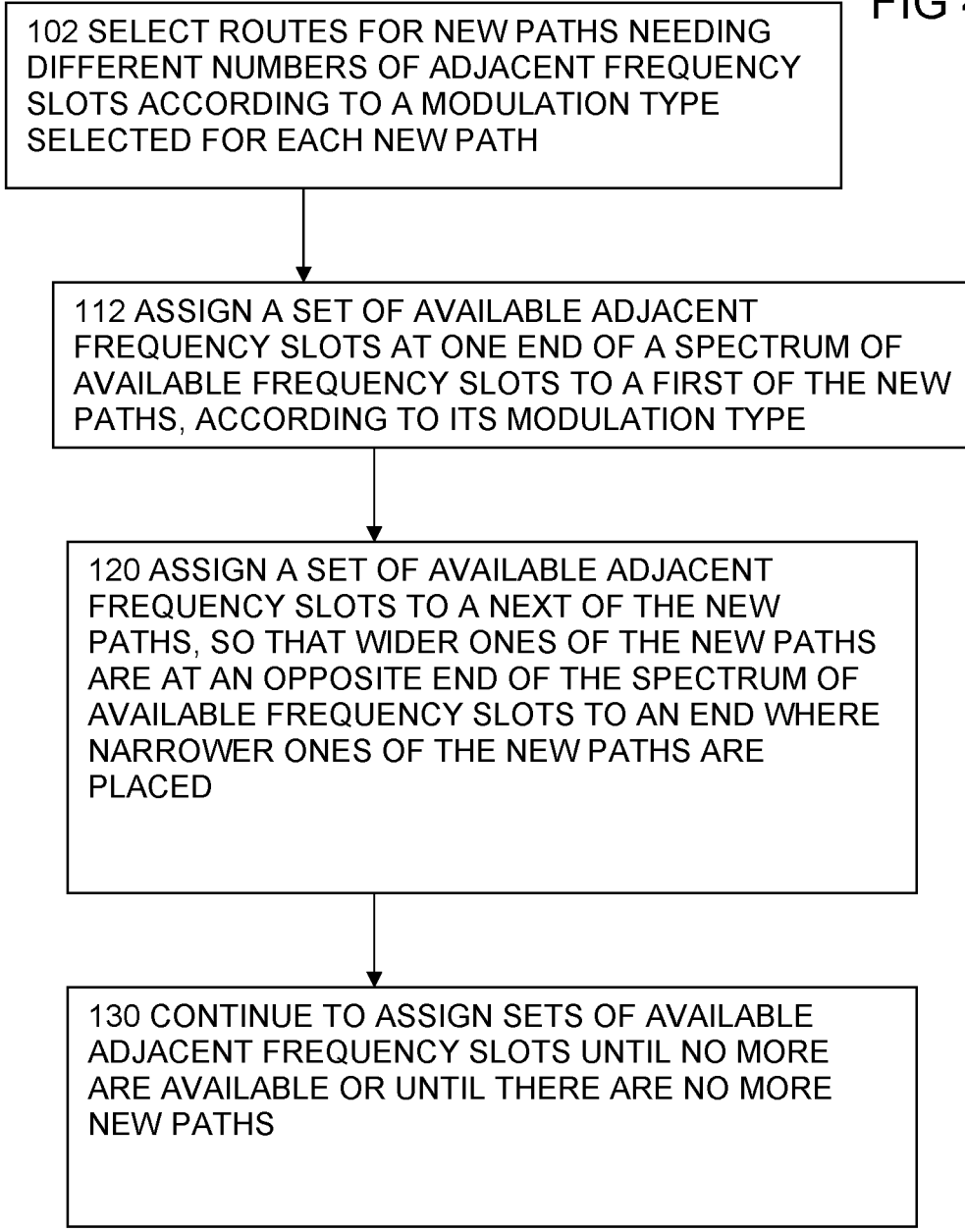
FIG. 4 shows steps of a method according to another embodiment in which slots are assigned according to modulation type.

FIG. 4 Method in which Slots are Assigned According to Modulation Type,

FIG. 4 shows steps of a method according to another embodiment in which slots are assigned according to modulation type. This is similar to FIG. 2, but step 100 is now step 102 in which the selection of route is made according to a modulation type selected for each new path. Step 110 is now step 112 in this figure, and the slot assignment is made to one end or the other end of the gap according to a modulation type. Examples of modulation types are at least 4-QAM, 16-QAM, and 64-QAM, using a single carrier, or multicarrier types such as OFDM.

Figure 5:
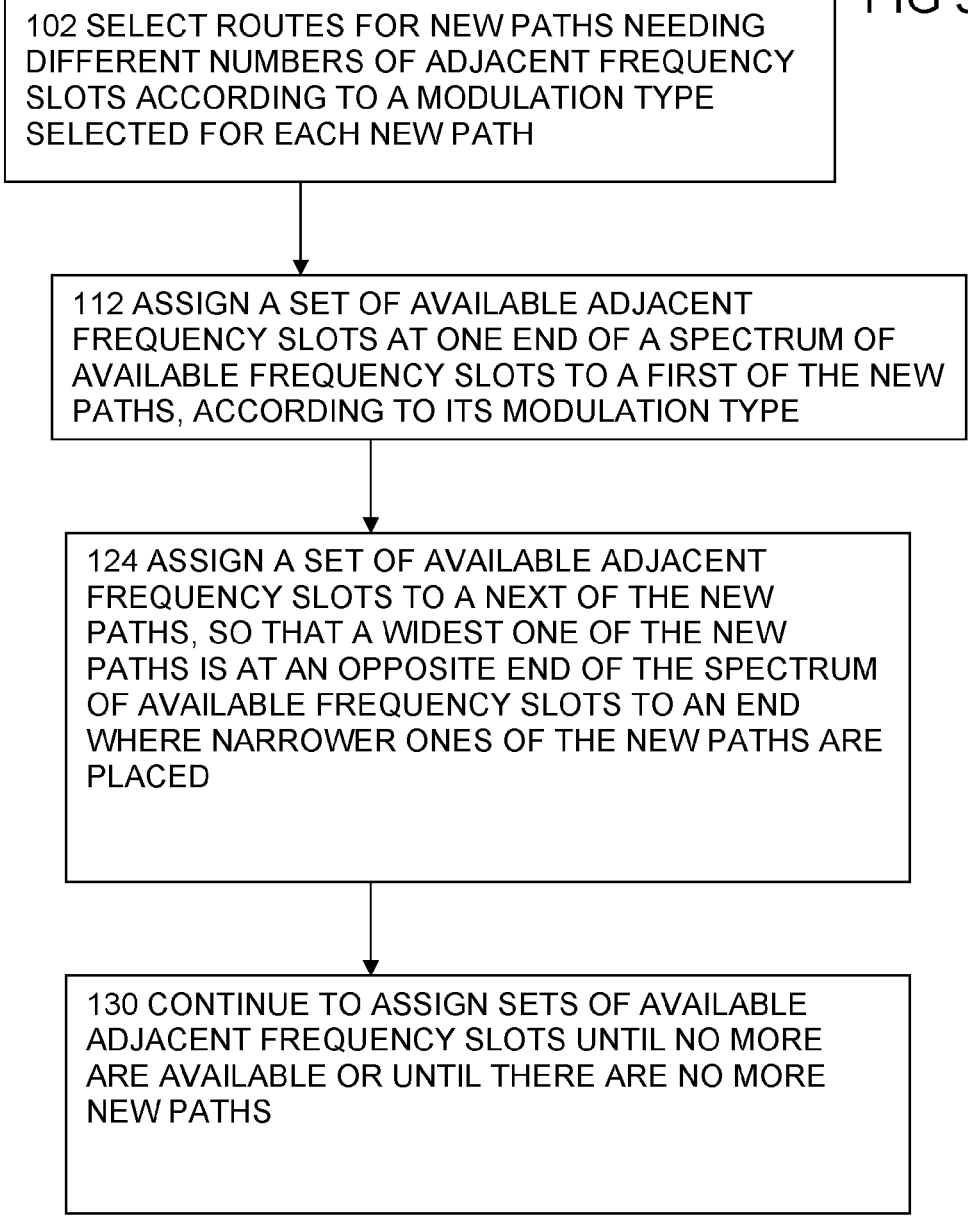
FIG. 5 shows steps of a method according to another embodiment in which just a widest of the new paths is assigned to an opposite end according to an embodiment.

FIG. 5 Method in which Just a Widest of the Paths is Assigned to an Opposite End FIG. 5 shows steps of a method according to another embodiment in which just a widest of the new paths is assigned to an opposite end according to an embodiment. This is similar to FIG. 4, except that step 120 becomes step 124 in which a widest one of the paths is assigned to the opposite end of the gap in the spectrum of slots, to all others of the paths.

Figure 6:
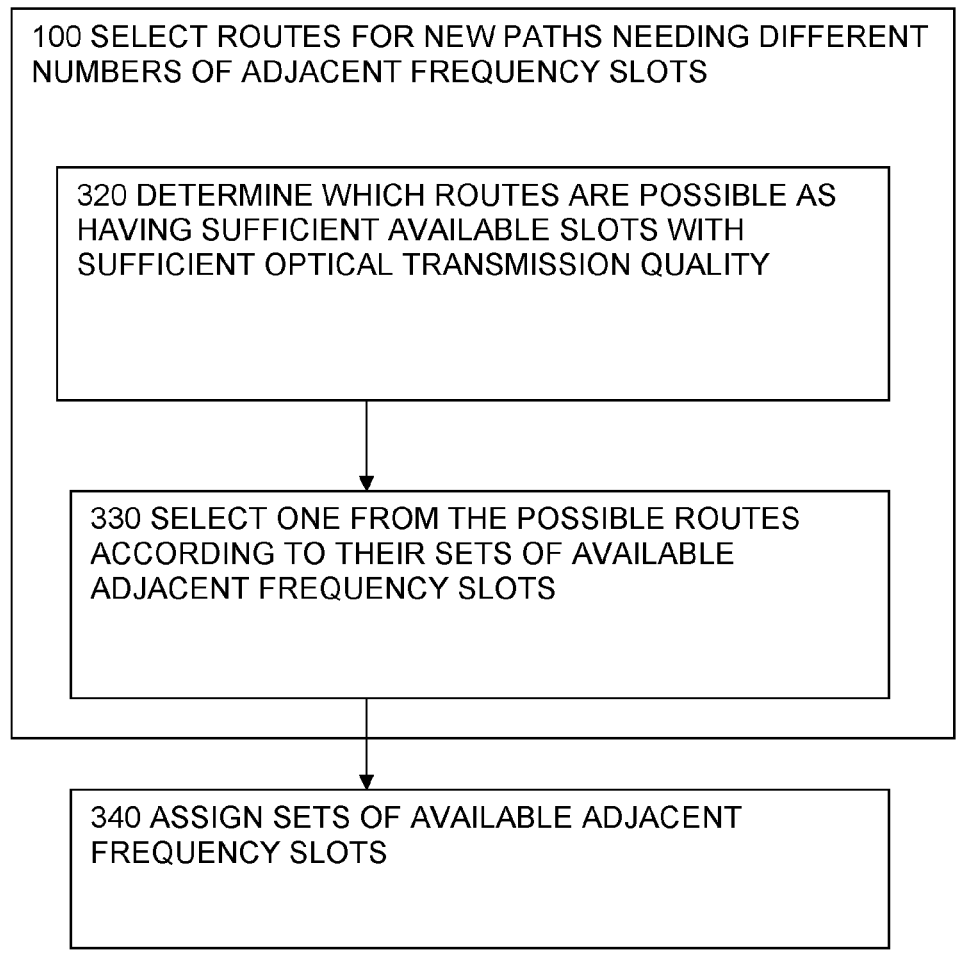
FIG. 6 shows steps of a method according to another embodiment in which routes are selected according to optical transmission quality.

FIG. 6 Method Having Routes Selected According to Optical Transmission Quality

FIG. 6 shows steps of a method according to another embodiment in which routes are selected according to optical transmission quality. Step 100 involves selecting routes for new paths needing different numbers of adjacent frequency slots. This step is shown as having two constituent steps, 320 and 330. At step 320 the PCE determines which routes are possible as having sufficient available adjacent slots with sufficient optical transmission quality for the respective new path. The optical transmission quality will typically depend on the length of the proposed route in terms of number of hops or of distance covered.

At step 330 the PCE selects one of the possible routes according to their available adjacent frequency slots. At step 340 the sets of slots are actually assigned to the new paths. This can be implemented for example using a conventional first-fit (FF) technique: the lowest-indexed adjacent n slots satisfying the slot continuity constraint are selected. With n=3, slots 4, 5, 6 are selected in relation to FIG. 7B described below.

Alternatively the method described above in relation to FIG. 2 could be used, which is a first-fit or last-fit (FF-LF) method. Depending on the width of the path, which may depend on the modulation format, the lowest- or the highest-indexed adjacent n slots satisfying the slot continuity constraint are selected. In the case of 100 Gb/s, LF is applied. In the case of 400 Gb/s, if the more efficient admitted modulation format is 4-QAM, FF is applied, otherwise LF is applied. As an example, in FIG. 7B, if n=3 (with 64-QAM), slots 5, 6, 7 are selected.

Finally, the PCE communicates the path route and the assigned slots to the source node "s". This can be implemented through ad-hoc extensions within the PCEP Reply message for example or by other techniques.

Figure 7A:
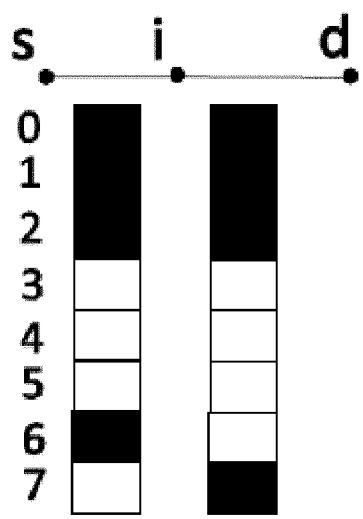
FIGS. 7A and 7B show a view of which slots are occupied for two possible routes for a new path.
Figure 7B:
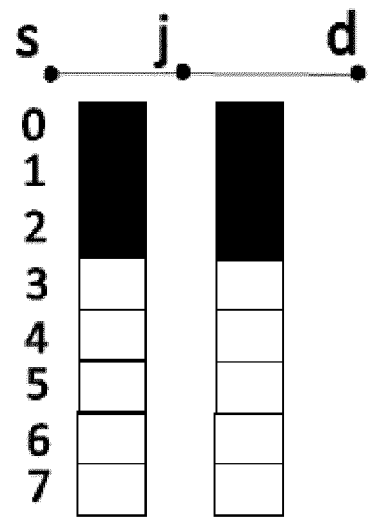

FIGS. 7A, 7B Slot Occupation for Two Different Routes

FIGS. 7A and 7B show a view of which slots are occupied for two possible routes for a new path needing three adjacent slots. A first possible route goes from source s to destination d via node I as shown in FIG. 7A. slots 3, 4, 5 and 7 are available for the first leg of the route, and slots 3, 4, 5 and 6 are available for the second leg. A second possible route goes from source s to destination d via node j as shown in FIG. 7B. In this possible route slots 3, 4, 5, 6 and 7 are available for both legs.

For the possible route shown in FIG. 7A, considering the path s-i-d and the required bandwidth n=3, only the three slots in the positions 3, 4, 5 can be selected since they are adjacent and available in each link of the possible route for the new path. Hence the gap size is four for the possible route of FIG. 7A, and there is only one possible set of slots. For the second possible route, the gap size is four and there are two possible sets of slots. The choice between these two possible paths can be made dependent on the sets. In this case the second possible route could be chosen, either because it has a larger gap, or because it has more different sets available.

FIG. 8 Method Having Routes are Selected According to Number of Sets or Widest Gap Between Occupied Slots FIG. 8 shows steps of a method according to another embodiment in which routes are selected according to which has most different sets or which has the widest gap between occupied slots. This is similar to FIG. 6, except that step 330 has two constituent steps 333 and 336 which are alternatives.

At step 333 the selection of the route is based on which of the possible routes has most different sets of available slots. Or, at step 336, the selection of the route is based on which of the possible routes has the widest gap between occupied slots.

Figure 9:
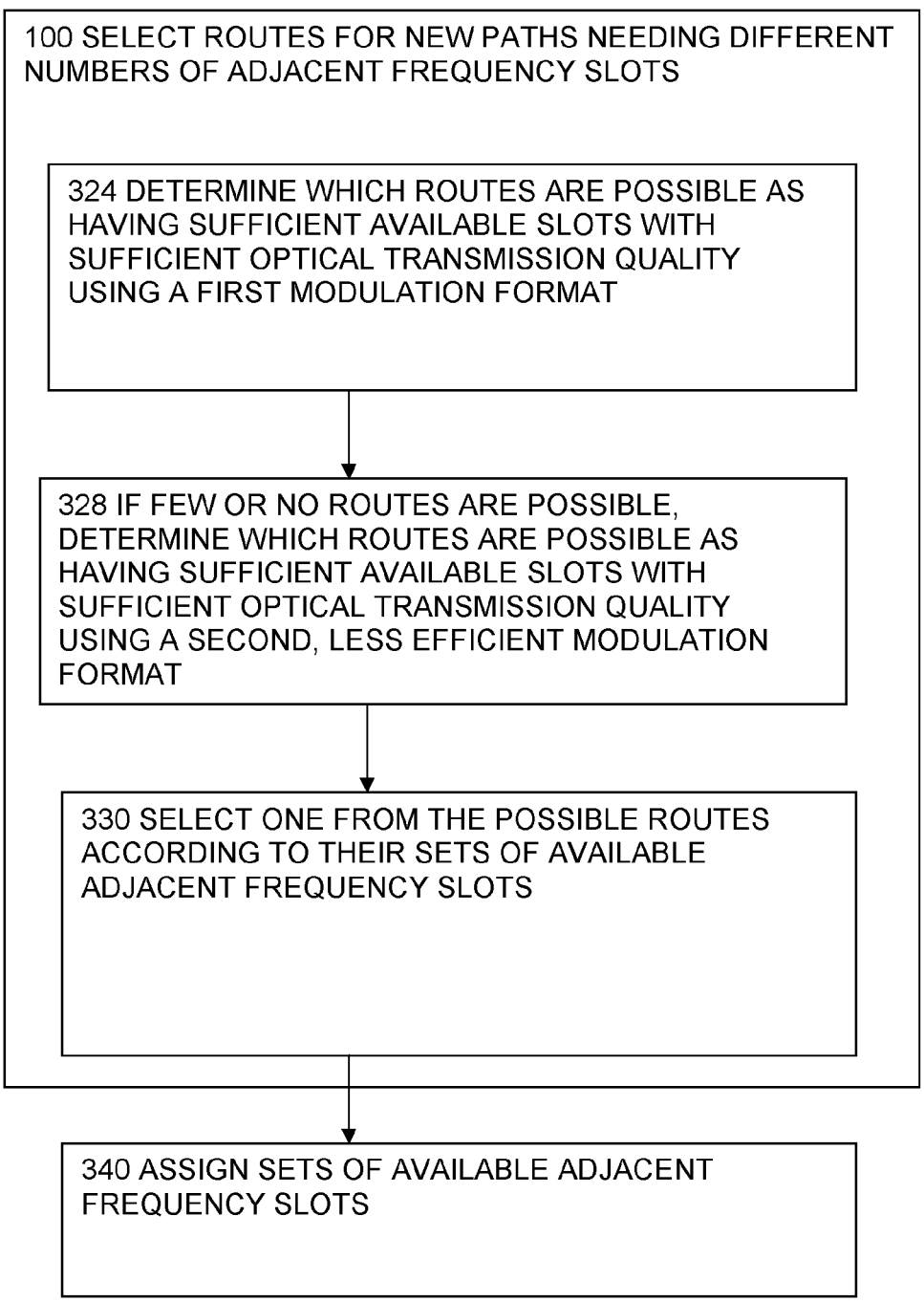
FIG. 9 shows steps of a method according to another embodiment in which if few or no routes are possible at a given transmission quality then routes are selected having sufficient transmission quality using a less efficient modulation format.

FIG. 9 Method Having Routes Selected Using a Less Efficient Modulation Format

FIG. 9 shows steps of a method according to another embodiment in which if few or no routes are possible at a given transmission quality then routes are selected having sufficient transmission quality using a less efficient modulation format. This is similar to FIG. 6, except that step 320 has two constituent steps, 324 and 328. At step 324 it is determined by the PCE which routes are possible as having sufficient available adjacent slots with sufficient optical transmission quality using a first modulation format. At step 328, if few or no routes are possible, which routes are possible as having sufficient available slots with sufficient optical transmission quality using a second, less efficient modulation format is determined.

An example of this proposed routing strategy, called maximum slot combinations with minimum required bandwidth—MaxSlots-MinBandwidth, is described as follows. Given the lightpath request and bit-rate or other specifications, the PCE finds the set Ps;d which is composed of paths satisfying the QoT with the minimum required bandwidth. Thus, in the case of 100 Gb/s, there is only one modulation format and Ps;d is simply composed of paths satisfying QoT, while if no path satisfies QoT, the request is blocked. In the case of 400 Gb/s, there is a choice of modulation formats, and Ps;d is first found for paths satisfying QoT with 64-QAM (with B=12.5 GHz, n=3, i.e. the most efficient modulation format in terms of bandwidth or slots needed). If no path satisfies QoT with 64-QAM, Ps;d is found for paths satisfying QoT with 16-QAM (n=5 with B=12.5 GHz). If no path satisfies QoT with 16-QAM, Ps;d is found for paths satisfying QoT with 4-QAM (n=9 with B=12.5 GHz). If no path satisfies QoT even with 4-QAM, the request is blocked. Then, among paths in Ps;d, PCE selects the one maximizing the number of possible combinations of adjacent slots satisfying the slot continuity constraint along the path. For instance, assuming a 400 Gb/s request, the two paths in FIG. 7, acceptable with 64-QAM (n=3), are considered. Considering the path s-i-d, only the three slots 3, 4, 5 can be selected since adjacent and satisfying the continuity constraint. Thus, the number of possible combinations is 1. Considering the path s-j-d the number of combinations is 3, and the following adjacent slots can be selected: 3, 4, 5, or 4, 5, 6, or 5, 6, 7. According to MaxSlots-MinBandwidth, the path s-j-d is selected.

Figure 10:
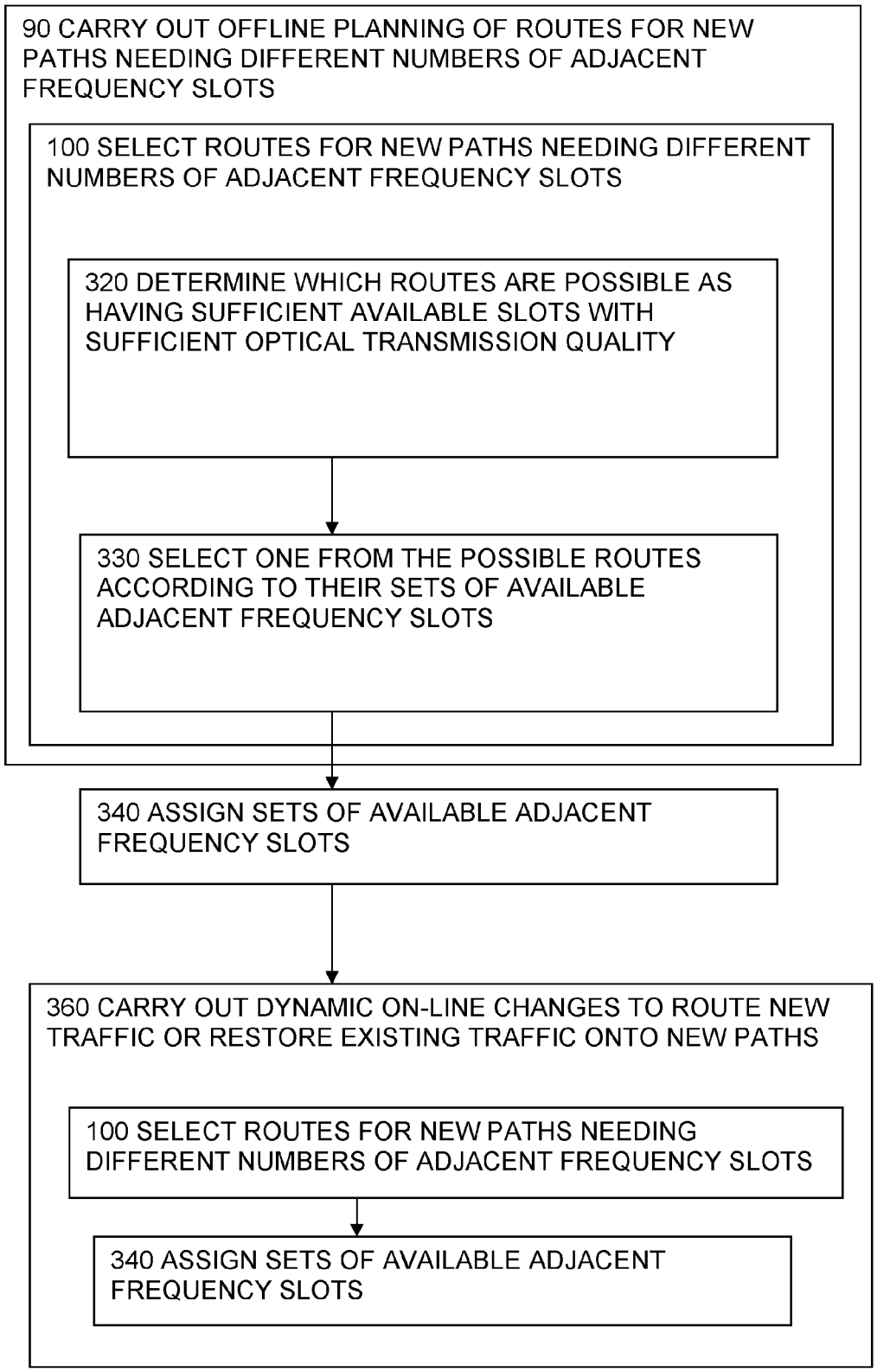
FIG. 10 shows steps of a method according to another embodiment showing off-line selection of routes and dynamic changes to route new traffic during operation.

FIG. 10 Method Having Off-Line Selection and Dynamic Changes

FIG. 10 shows steps of a method according to another embodiment showing off-line selection of routes and dynamic changes to route new traffic during operation. This is similar to FIG. 6 except as follows. The route selection is part of a step 90 for carrying out off line planning of routes for new paths.

There is a later step 360 of carrying out dynamic changes while the network is operational, or on-line, to route new traffic or restore existing traffic onto new paths. This includes a step 100 of selecting a route for new paths needing different numbers of adjacent slots, and a step 340 of assigning sets of available adjacent slots for the new path once the route is selected.

FIG. 11 Method Involving Determining Reach for a Given Error Rate

FIG. 11 shows steps of a method according to another embodiment involving determining if there is sufficient reach with a given error rate, when selecting routes. This is similar to FIG. 6 except that step 320 has a constituent step 323. This involves determining which routes are possible by determining if there is sufficient optical reach to provide a signal with a given error rate for the distance of the route and for the modulation format used.

FIG. 12 Method Having Checking for Availability of Optical Regeneration

FIG. 12 shows steps of a method according to another embodiment involving checking if optical regeneration is available along the route if there is not sufficient reach with a given error rate. This is similar to FIG. 11 except there is an additional step 327 after step 323. At step 327, if there is not sufficient optical reach, then a check is made to see if there is any optical regeneration available along the route, which could extend the reach sufficiently.

FIG. 13 PC Based Embodiment.

FIG. 13 shows a PC based PCE and database according to another embodiment. This is similar to the embodiment of FIG. 1, but in this case the PCE is implemented by a path computation program 34 executed by a personal computer PC 32, and the network topology database 10 is implemented by a database program 14 executed by a PC 12. This enables existing hardware, operating systems and communications hardware and software to be used to save costs.

Blocking Probability Experienced by MaxSlot-MinBandwidth

The performance of the proposed lightpath provisioning was evaluated through a custom C++ event-driven simulator on a network with E=30, V=56. 12.5 GHz grid spacings were used, consequently the total number of slots S per link is 320. QoT is regarded as acceptable if a threshold of for example $BER<10^{-3}$ before forward error correction is met. The OSNR thresholds can be as set out in the above mentioned pfau reference for example, or more accurate models can be considered. Lightpath requests are uniformly distributed among s-d pairs and bit-rates. Inter-arrival and holding times are exponentially distributed with an average of $1/\lambda$ and $1/\mu=500$ s, respectively. Traffic load is expressed as $\lambda/\mu$. Two cases for Ps;d are assumed. First, Ps;d is composed of shortest paths in terms of hops (SHs). Then, Ps;d is composed of paths within one hop from the shortest path in terms of hops (SH+1 s).

It was found that blocking probability increases with traffic load since the network is more populated and it is more difficult to find a path with n adjacent slots satisfying the slot continuity constraint. Considering a larger set of paths Ps;d (SH+1 s instead of only SH) can reduce the blocking probability, since more likely a path with n adjacent slots satisfying the slot continuity constraint is found. Blocking is mainly determined for 4-QAM 400 Gb/s lightpaths which require the largest number of slots (n=9). Those lightpaths are more likely associated with long paths which are characterized by a low OSNR, thus they cannot be used with 64- or 16-QAM. By analyzing simulations, it was seen that the application of FF led to groups of up to eight adjacent free slots: in this case the provisioning of 16- and 64-QAM was allowed while of 4-QAM was prevented. On the other hand, the slot assignment using FF/LF was found to give better performance than FF because it exploits slot resources in a more efficient way, so nine adjacent available slots are more likely to be found.

CONCLUDING REMARKS

As has been described, embodiments can be applied to PCE-based WSONs with multi-rate and flexible-bandwidth devices, to provision lightpaths, supported by single-carrier technology for example. Two strategies to select the required frequency slots are explained. Network resources can be utilized more efficiently by making slot assignments that leave larger gaps. This can enable more new paths that are wider, which is particularly useful to enable more use of more efficient modulation formats in terms of bandwidth. Among two strategies for slot selection, FF/LF obtains lower blocking than FF for two different set of paths. Various grid spacing values can be used (e.g. 6.25 GHz). Other variations and additions can be envisaged within the claims.

The invention claimed is:

1. A method of routing and bandwidth assignment of new paths in a wavelength switched optical network, the network being arranged to carry paths of different bandwidths, occupying different numbers of adjacent frequency slots, the method having the steps of:
selecting a route for each of the new paths; and
assigning a set of adjacent frequency slots to each respective new path,
wherein for selected routes having more than one available set of sufficient adjacent frequency slots for their respective new paths, the assignment is made so as to place wider bandwidth ones of the new paths at an end of a spectrum of the available frequency slots, opposite to an end of the spectrum of the available frequency slots where narrower bandwidth ones of the new paths are placed.

2. The method of claim 1, wherein the network is able to carry paths using different modulation formats, and the slot assignment is made dependent on the modulation format chosen for the respective new path.

3. The method of claim 1, the network having a path computation element and a database of slot availabilities, and the step of assigning the slots being carried out by the path computation element by accessing the database of slot availabilities.

4. The method of claim 1, wherein only the paths having the widest bandwidth of path sizes are assigned to the opposite end of the spectrum.

5. The method of claim 1, the step of selecting the route being made according to which of the possible routes having a larger number of different sets of available adjacent frequency slots.

6. The method of claim 1, the step of selecting the route being made based on a first modulation format, and if no route is possible for a given new path using the first modulation format, the step of selecting the route comprises trying again using a second, less efficient modulation format in terms of needing to occupy more adjacent frequency slots.

7. The method of claim 1, the routing and frequency slot assignment being carried out dynamically in real time for requests for new paths while the network is in operation.

8. An apparatus for routing and bandwidth assignment of new paths in a wavelength switched optical network, the network being arranged to carry paths of different bandwidths, occupying different numbers of adjacent frequency slots, the apparatus comprising:
a processor and non-transitory computer-readable medium coupled to the processor, wherein the non-transitory computer-readable medium including a selection part, wherein the selection part arranged to select a route for each of the new paths, and assign a set of adjacent frequency slots to each respective new path, wherein for selected routes having more than one available set of sufficient adjacent frequency slots for their respective new paths, the assignment is made so as to place wider bandwidth ones of the new paths at an end of a spectrum of the available frequency slots, opposite to an end of the spectrum of available frequency slots where narrower bandwidth ones of the new paths are placed.

9. A method of routing and bandwidth assignment of new paths in a wavelength switched optical network, the network being arranged to carry paths of different bandwidths, occupying different numbers of adjacent frequency slots, the method having the steps of:
selecting a route for each of the new paths; and
assigning a set of adjacent frequency slots to each respective new path,
wherein the step of selecting the route comprises the steps of determining which routes are possible in terms of having sufficient available adjacent frequency slots with sufficient optical transmission quality for the respective new path, and selecting which of the possible routes to use according to their sets of available adjacent frequency slots, and wherein the selecting is to place the respective new path at an end of a spectrum of the available adjacent frequency slots or at the opposite end of the spectrum of the available frequency slots depending on bandwidth of the respective new path.

10. The method of claim 9, the step of selecting the route being made based on a first modulation format, and if no route is possible for a given new path using the first modulation format, the step of selecting the route comprises trying again using a second, less efficient modulation format in terms of needing to occupy more adjacent frequency slots.

11. The method of claim 9, the routing and frequency slot assignment being carried out dynamically in real time for requests for new paths while the network is in operation.

12. The method of claim 9, the step of determining of which routes are possible having the steps of determining a distance for each route, and determining whether there is sufficient reach of an optical signal, according to a modulation format being used, for the distance involved.

13. The method of claim 9, the step of selecting which of the possible routes to use according to their sets of available adjacent frequency slots comprising a step of selecting according to which has a larger total number of different sets.

14. The method of claim 9, the step of selecting which of the possible routes to use according to their sets of available adjacent frequency slots comprising a step of selecting according to which has a wider gap between occupied slots.

15. The method of claim 12, the determining of which routes are possible having the step of, where there is not sufficient reach, determining if optical regeneration is available along the route, and determining if the route is possible with any available optical regeneration.

16. The method of claim 10, the modulation formats comprising at least 4-QAM, 16-QAM, and 64-QAM, using a single carrier.

17. The method of claim 10, the modulation formats comprising at least orthogonal frequency division multiplexed.

18. An apparatus for routing and bandwidth assignment of new paths in a wavelength switched optical network, the network being arranged to carry paths of different bandwidths, occupying different numbers of adjacent frequency slots, the apparatus comprising:
a processor and non-transitory computer-readable medium coupled to the processor, wherein the non-transitory computer-readable medium including a selection part, wherein the selection part for selecting a route for each of the new paths, and for assigning a set of adjacent frequency slots to each respective new path, the selection part being arranged to determine which routes are possible in terms of having sufficient available adjacent frequency slots with sufficient optical transmission quality for the respective new path, and to select which of the possible routes to use according to their sets of available adjacent frequency slots, and wherein the selecting is to place the respective new path at an end of a spectrum of the available adjacent frequency slots or at the opposite end of the spectrum of the available frequency slots depending on bandwidth of the respective new path.

19. A non-transitory computer readable medium having instructions which when executed by a computer, cause the computer to carry out a method of routing and bandwidth assignment of new paths in a wavelength switched optical network, the network being arranged to carry paths of different bandwidths, occupying different numbers of adjacent frequency slots, the method comprising:

selecting a route for each of the new paths; and assigning a set of adjacent frequency slots to each respective new path, wherein for selected routes having more than one available set of sufficient adjacent frequency slots for their respective new paths, the assignment is made so as to place wider bandwidth ones of the new paths at an end of a spectrum of the available frequency slots, opposite to an end of the spectrum of the available frequency slots where narrower bandwidth ones of the new paths are placed.

20. A non-transitory computer readable medium having instructions which when executed by a computer, cause the computer to carry out a method of routing and bandwidth assignment of new paths in a wavelength switched optical network, the network being arranged to carry paths of different bandwidths, occupying different numbers of adjacent frequency slots, the method comprising:

selecting a route for each of the new paths; and assigning a set of adjacent frequency slots to each respective new path, wherein the step of selecting the route comprises the steps of determining which routes are possible in terms of having sufficient available adjacent frequency slots with sufficient optical transmission quality for the respective new path, and selecting which of the possible routes to use according to their sets of available adjacent frequency slots, and wherein the selecting is to place the respective new path at an end of a spectrum of the available adjacent frequency slots or at the opposite end of the spectrum of the available frequency slots depending on bandwidth of the respective new path.

\* \* \* \* \*